Aug. 17, 1965   A. G. BUHR ETAL   3,201,005
FERTILIZER DISTRIBUTOR
Filed Nov. 6, 1963

Inventors
August G. Buhr
Willard H. Tamke
Kenneth R. Weber
By  W. Girald
Attorney 3,201,005
FERTILIZER DISTRIBUTOR
August G. Buhr, Willard H. Tanke, and Kenneth R. Weber, La Crosse, Wis., assignors to Allis-Chalmers Manufacturing Company, Milwaukee, Wis.
Filed Nov. 6, 1963, Ser. No. 321,894
11 Claims. (Cl. 222—272)

This invention relates to fertilizer distributors. More particularly, the invention is concerned with apparatus for dispensing chemical fertilizer from a hopper in two rows at a time as is usually desired for row crops such as corn.

Fertilizer distributors of the mentioned character have heretofore been known wherein a pair of oppositely pitched feed augers are assembled end to end in the bottom part of a fertilizer hopper, and wherein unitary rotation of the auger assembly in one direction causes discharge of fertilizer simultaneously through two openings in the bottom wall of the hopper near the outer ends, respectively, of the auger assembly.

Generally, it is an object of the invention to provide an improved fertilizer distributor of the type incorporating a pair of oppositely pitched feed augers in the bottom part of a hopper, the improvement residing in a novel construction and arrangement of the component parts of the apparatus which will permit ready disassembly of the apparatus for cleaning purposes, complete removal of residual fertilizer from the hopper and ready reassembly of the parts after they have been cleaned.

More specifically, it is an object of the invention to provide an improved fertilizer distributor of the mentioned character which takes care of the requirements for ready assembly and disassembly of its component parts and for efficient cleaning in a practical and extremely simple manner.

A further object of the invention is to provide an improved fertilizer distributor of the above mentioned character incorporating a readily removable baffle above the auger assembly, which will reduce the tendency of the fertilizer to pack around the augers during field travel, and particularly during highway travel of the distributor when the auger assembly is not being rotated.

A still further object of the invention is to provide an improved fertilizer distributor of the above mentioned character wherein the flow of fertilizer from either of the feed augers will be accommodated by a spill passage leading to the outside of the hopper when the normal fertilizer flow from either of the feed augers through an associated discharge spout and tube should accidentally become obstructed.

These and other objects and advantages are attained by the present invention, various novel features of which will be apparent from the description herein and pointed out in the appended claims.

Referring to the accompanying drawings.

Figure 1:
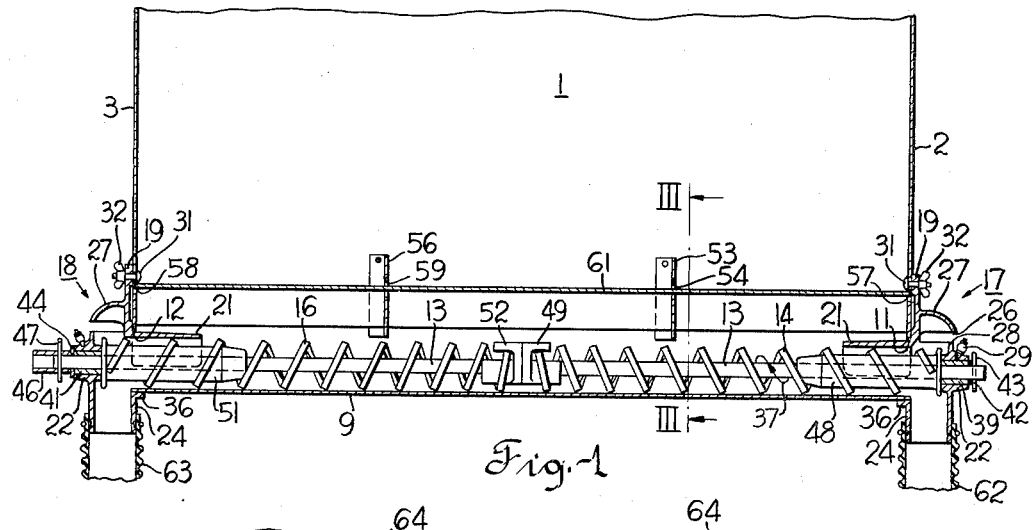
FIG. 1 is a sectional view of a fertilizer distributor embodying the invention, the view being taken on a vertical longitudinally extending center plane indicated by the line I—I in FIG. 2.
Figures 2, 3:
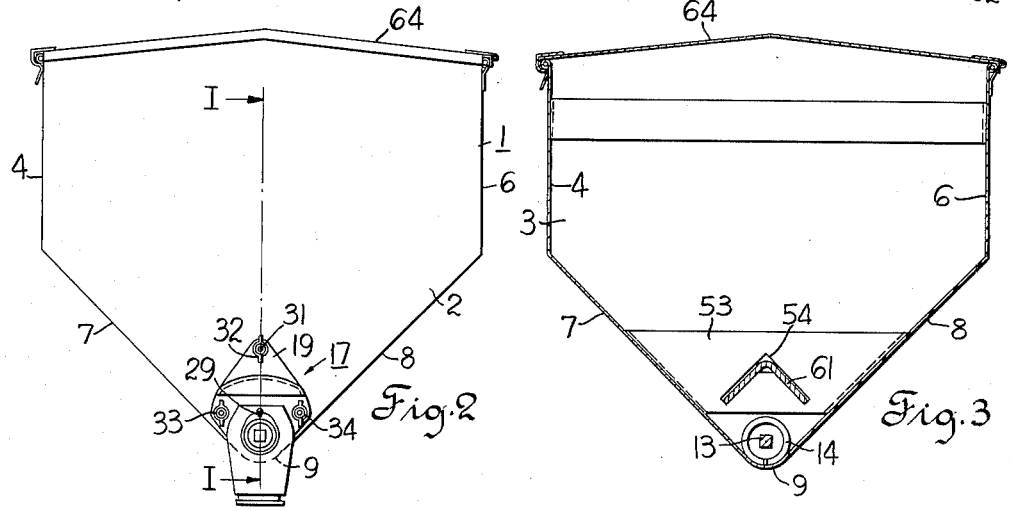
FIG. 2 is an elevational end view of the fertilizer distributor shown in FIG. 1.
FIG. 3 is a sectional view on a transverse plane indicated by the line III—III in FIG. 1 and showing lower parts including a transverse internal brace of the fertilizer distributor.

The reference character 1 in FIGS. 1 and 2 generally designates a fertilizer hopper having transverse ends walls 2 and 3 of the configuration shown in FIG. 2 and an imperforate sheet metal structure presenting vertical upper front and rear walls 4 and 6, converging front and rear bottom walls 7 and 8 and an arcuate connecting trough 9 between the bottom walls 7 and 8. The front and rear walls 4, 6 and the converging bottom walls 7, 8 are secured at their opposite ends to corresponding vertical and converging edge portions, respectively, of the end walls 2 and 3.

Figure 4:
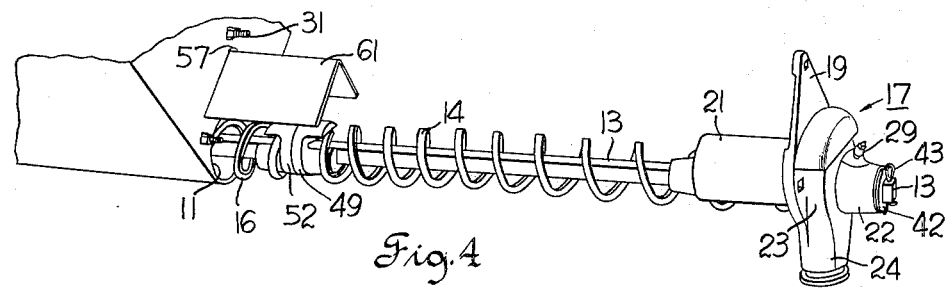
FIG. 4 is an enlarged detail view in perspective showing parts of the distributor of FIG. 1 in partly disassembled condition.

The right-hand end of the bottom trough 9 terminates in the vertical plane of the right-hand end wall 2. As shown in FIG. 4, the right-hand end of the hopper 1 has a circular side opening 11 immediately adjacent the right-hand end of the bottom trough 9, the curvature of the latter being complementary to the edge of a circularly arcuate cutout at the lower end of the right-hand end wall 2.

The left-hand end of the bottom trough 9 terminates in the vertical plane of the left-hand end wall 3. A circular side opening 12 (FIG. 1) in the left-hand end of the hopper 1 is defined by the curvature of the bottom trough 9 and the complementary edge of a circularly arcuate cutout at the lower end of the left-end wall 3, the side opening 12 being opposite to and of the same size as the side opening 11 shown in FIG. 4.

As illustrated by FIG. 4, a feed auger assembly comprising a shaft 13 and oppositely pitched wire spirals 14 and 16 is movable axially into and out of the hopper 1 through the right-hand side opening 11. In the assembled condition of the parts as shown in FIG. 1, the shaft 13 is rotatably supported at its opposite ends in outlet housings 17 and 18 which are detachably secured externally of the hopper 1 to the end walls 2 and 3 in covering relation to the side openings 11 and 12, respectively.

The outlet housing 17 at the right end of the hopper 1 comprises a generally triangular mounting flange 19; a semicylindrical auger shield 21 at one side of the flange 19; a generally cylindrical bearing boss 22 at the other side of the flange 19; a peripheral wall structure 23 (FIG. 4) connecting the bearing boss 22 with the flange 19; and a tubular discharge spout 24 in depending relation to the flange 19 and wall structure 23. The peripheral wall structure of the outlet housing 17 includes a fertilizer spill passage 26 above the bearing boss 22, the spill passage being defined by a canopy wall 27 which overhangs an upstanding flange portion 28 of the bearing boss 22 and which has a lower horizontal edge in upwardly spaced relation to the upper arcuate edge of the flange portion 28. A grease fitting 29 is mounted in the bearing boss 22 at the outer side of the flange portion 28.

As shown in FIG. 1, a short carriage bolt 31 extends from the interior of the hopper 1 through a square hole in the end wall 2 and through a registering hole in the upper part of the triangular flange 19 of the outlet housing 17. A wing nut 32 is drawn up on the bolt 31 against the flange 19 so as to clamp the outlet housing 17 into abutting engagement with the outside surface of the end wall 2. As shown in FIG. 2, additional wing nuts 33 and 34 are carried by additional carriage bolts corresponding to the carriage bolt 31 for securing the outlet housing 17 to the end wall 2 in covering relation to the side opening 11.

In the mounted condition of the outlet housing 17 on the fertilizer hopper 1 as shown in FIG. 1, the auger shield 21 extends into the hopper through the upper part of the circular side opening 11. The shield 21 is curved concentrically with the bearing boss 22 and it presents a downwardly facing cylindrically arcuate inner surface in overlying relation to the bottom trough 9 of the hopper 1. At the axially inner side of the bearing boss 22, the outlet housing 17 has a generally circular aperture which is defined in part by the inner surface of the auger shield 21 and in part by an arcuate flange portion 36 at the upper end of the discharge spout 24. Mounting of the outlet housing 17 on the hopper by means of the carriage bolts and associated wing nuts 32, 33 and 34 places the flange 36 into axially overlapping relation with the right end of the bottom trough 9, and fertilizer advanced along the bottom trough toward the outlet housing 17 by rotation of the wire spiral 14 in the direction of arrow 37 will therefore drop directly into the tubular discharge spout 24.

The outlet housing 18 at the left end of the hopper 1, as shown in FIG. 1, is a duplicate of the outlet housing 17 at the right end, and the foregoing explanations with respect to the construction and mounting of the outlet housing 17 analogously apply to the construction and mounting of the outlet housing 18. The same reference characters which designate various parts of the outlet housing 17 have been applied in FIG. 1 to designate corresponding parts of the outlet housing 18. When the left-hand auger spiral 16 is rotated in the direction of arrow 37, it advances fertilizer toward the side opening 12 and over the left-hand edge of the bottom trough 9 into the discharge spout 24 of the outlet housing 18.

The auger shaft 13 is made of rectangular bar stock and it is of such length that in the assembled condition of the apparatus as shown in FIG. 1, the right end of the shaft extends axially outward beyond the bearing boss 22 of the outlet housing 17, and the left end of the shaft extends axially outward beyond the bearing boss 22 of the outlet housing 18. Bearing bushings 39 and 41 rotatably support the shaft within the bearing bosses of the outlet housings. Each bearing bushing has a square axial bore which matches the cross section of the shaft 13 and which is dimensioned to permit axial sliding movement of the bearing bushing upon and from the shaft. The bearing bosses of the outlet housings are cylindrically bored and the bushings 39 and 41 have exterior cylindrical surfaces finished for running fit within the bearing bosses 22.

A washer 42 and cotter pin 43 on the right end of the shaft 13 releasably secure the shaft against axial inward displacement relative to the outlet housing 17. A washer 44, coupling sleeve 46 and quick pin 47 on the left end of the shaft releasably secure the shaft against axial inward displacement relative to the outlet housing 18.

The helical auger spiral 14 is made of square wire and has a sufficiently large inside diameter to provide substantial radial clearance between the spiral and the shaft 13. The pitch of the spiral progressively increases from the midportion of the hopper toward the right end wall 2. A guide sleeve 48 for the right end of the spiral 14 surrounds the shaft 13 at the axially inner side of the right bearing boss 22. The guide sleeve 48 has a square axial bore which matches the cross section of the shaft 13 and a cylindrical outer surface of the sleeve 48 matches the internal diameter of the spiral 14. The external diameter of the spiral 14 matches the adjacent cylindrically arcuate surface of the auger shield 21 and the inside curvature of the bottom trough 9.

An anchor plug 49 is nonrotatably fitted upon a midportion of the shaft 13 and has a torque transmitting connection with the axially inner end of the spiral 14.

The auger spiral 16 is made of square wire like the auger spiral 14, but it is wound in a direction opposite to that in which the spiral 14 is wound. The pitch of the spiral 16 progressively increases from the midportion of the hopper toward the left end wall 3. A guide sleeve 51 corresponding to the guide sleeve 48 supports the outer end of the spiral 16 on the shaft 13 in cooperative relation to the auger shield 21 of the left outlet housing 18 and to the bottom trough 9. An anchor plug 52 corresponding to the anchor plug 49 connects the shaft 13 in torque transmitting relation with the axially inner end of the spiral 16.

Referring to FIG. 3, a transverse plate metal brace 53 is mounted within the lower part of the hopper 1 between the converging front and rear bottom walls 7 and 8 and above the auger spiral 14. The opposite ends of the brace are secured to the inner surfaces of the bottom walls 7 and 8 by welding. Midway between its ends the brace 53 has an anticlinal slot 54 which presents an apex vertically above the auger shaft 13 and which diverges symmetrically downward toward the bottom walls 7 and 8. Identical anticlinal slots in a horizontal alignment with the slot 54 in the brace 53 are provided in the end walls 2 and 3 of the hopper and in a brace 56 (FIG. 1) which is mounted between the bottom walls 7 and 8 above the auger spiral 16 and which is a duplicate of the brace 53. The anticlinal slot in the hopper end wall 2 is partly shown in FIG. 4 and designated by the reference character 57. The corresponding anticlinal slots in the hopper end wall 3 and in the brace 56 are indicated in FIG. 1 by the reference characters 58 and 59, respectively.

Referring to FIG. 4, a sheet metal baffle 61 is shown to project outward from the hopper end wall 2 through the anticlinal slot 57. The baffle 61 has a cross sectional profile matching the anticlinal slots 54, 57, 58 and 59. The overall length of the baffle 61 is substantially equal to the spacing between the outside surface of the hopper end wall 2 and the outside surface of the hopper end wall 3. The anticlinal slots 54, 57, 58 and 59 each present upper and lower edge portions in slidably engageable relation with the upper and lower surfaces, respectively, of the baffle 61.

In the assembled condition of the hopper as shown in FIG. 1, the baffle 61 is seated in the anticlinal slots 57 and 58 of the hopper end walls 2 and 3, and in the anticlinal slots 54 and 59 of the braces 53 and 56. The slot 57 in the hopper end wall 2 is covered by the flange 19 of the outlet housing 17, and longitudinal outward displacement of the baffle through the slot 57 is prevented by endwise abutment of the baffle with the outlet housing 17. Similarly, the slot 58 in the left hopper end wall 3 is covered by the flange 19 of the outlet housing 18, and longitudinal outward displacement of the baffle 61 through the slot 58 is prevented by endwise abutment of the baffle with the outlet housing 18.

For conventional use of the herein disclosed fertilizer distributor on a corn planter, the hopper 1 may be supported intermediate its ends on a suitable bracket structure not shown. The coupling sleeve 46 will be secured, as by welding, to the end of a drive shaft, not shown, forming part of a conventional drive mechanism for the auger shaft 13. Flexible tubes 62 and 63 are connected with the discharge spouts 24 of the outlet housings 17 and 18, respectively, for conveying fertilizer to a pair of fertilizer boots and associated furrow openers of the planter, not shown. The top of the hopper 1 will be covered by a lid 64 (FIG. 2).

In operation, fertilizer flows from the space above the baffle 61 to the auger spirals 14 and 16 through the gaps between the longitudinal bottom edges of the baffle 61 and the adjacent bottom walls of the hopper. The baffle reduces the tendency of the fertilizer to pack around the auger spirals, particularly during transport of the planter on a road or highway, when the auger drive is disconnected. Upon establishment of the auger drive, the spirals 14 and 16 rotate in the direction of arrow 37 and feed fertilizer into the discharge spouts of the outlet housings as has been explained hereinbefore.

In the event that a blockage occurs in one of the discharge tubes 62, 63 or in an associated fertilizer boot, not shown, continued rotation of the auger assembly will force fertilizer through the spill passage 26 of the respective outlet housing 17 or 18. As a result of such overflow, possible damage to the dispensing mechanism will be avoided. At the same time, the fertilizer boiling out of the spill passage will be a signal to the operator of the planter that the apparatus is not functioning properly.

In order to disassemble the fertilizer distributor for cleaning, the quick pin 47 at the left end of the auger shaft 13 is withdrawn from the shaft and from the coupling sleeve 46, and the three wing nuts 32, 33 and 34 which bear against the flange 19 of the outlet housing 17 at the right end of the hopper are removed. The tube 62 is preferably detached from the discharge spout 24 of the outlet housing 17 so that it may remain on the planter while the auger assembly is axially withdrawn as a unit through the end opening 11 of the right end wall 2 as shown in FIG. 4. Such unitary withdrawal may readily be accomplished by pulling the housing 17 from the shanks of the carriage bolts on which the housing 11 is supported and from which the wing nuts 32, 33 and 34 have been removed. Withdrawal of the auger assembly and outlet housing 11 as a unit from the hopper 1 will cause the left end of the shaft 13 to pull out of the coupling sleeve 46 and through the bearing bushing 41 which may remain in the bearing boss 22 of the left outlet housing 18. The wire spirals 14, 16, anchor plugs 49, 52, guide sleeves 48, 51 and outlet housing 17 may thoroughly be cleaned of adhering fertilizer after removal from the hopper and, if desired, the outlet housing 17, together with the bearing bushing 39 in its bearing boss 22, may be withdrawn from the shaft 13 after removal of the cotter pin 43 from the right end of the shaft.

Removal of the outlet housing 17 from the fertilizer hopper as shown in FIG. 4 also uncovers the anticlinal slot 57 in the right end wall 2 of the hopper. Reaching through the top opening of the hopper and taking hold of the baffle 61, an operator may then slide the baffle 61 lengthwise to the right and out of the hopper.

Removal of the auger assembly and baffle from the hopper leaves the bottom part of the hopper unobstructed for convenient cleaning, as with a broom.

After all parts have been cleaned the apparatus may readily be reassembled in an obvious manner.

Instead of pulling the auger assembly and baffle out of the hopper through the right end wall 2 as indicated in FIG. 4, the removal of these parts may similarly be effected through the left end wall 3 of the hopper. This alternative procedure would be followed in a case where the hopper is mounted on the planter in a position which makes it necessary to apply the drive to the right end of the shaft 13 which projects from the outlet housing 17. The washer 42 and cotter pin 43 would then be installed on the left end of the shaft 13, and the wing nuts which bear against the flange 19 of the left outlet housing 18 would have to be removed preparatory to endwise withdrawal of the auger assembly and baffle through the left end wall 3 of the hopper. In either case, the wing nuts and threaded shanks of their respective carriage bolts are on the outside of the hopper, and there are no threaded connections inside the hopper which would be subject to rapid deterioration by the corrosive action of the fertilizer.

It should be understood that it is not intended to limit the invention to the details of construction herein shown and described and that the invention includes such other forms and modifications as are embraced by the scope of the appended claims.

The embodiments of the invention in which an exclusive property or privilege is claimed are defined as follows:

1. In a fertilizer distributor, the combination of a hopper having imperforate, longitudinal side and bottom walls and a pair of end walls presenting side openings, respectively, of said hopper adjacent said bottom wall; a pair of outlet housings, one detachably secured externally of said hopper to one of said end walls in overlying relation to the side opening therein, and the other operatively mounted externally of said hopper on the other of said end walls in overlying relation to the side opening therein, each of said outlet housings presenting a downwardly extending outlet spout exteriorly of its associated end wall; an assembly of oppositely pitched feed augers movable axially into and out of said hopper through the side opening of said one end wall, and rotatably mounted at one end in said one outlet housing; and axially separable bearing means rotatably mounting said auger assembly at its other end in said other outlet housing; said auger assembly communicating at its opposite ends in material dispensing relation, respectively, with said outlet housings.

2. The combination as set forth in claim 1 wherein each of said outlet housings has a fertilizer spill opening in a portion thereof extending upwardly from its associated outlet spout exteriorly of said hopper.

3. The combination as set forth in claim 1, wherein each of said outlet housings has a flange portion exteriorly of its associated hopper end wall, and wherein said flange portions are detachably secured to said end walls, respectively, by bolts having heads within said hopper and threaded shanks extending outwardly therefrom through said flanges, and by nuts threaded upon said shanks.

4. The combination as set forth in claim 1, wherein said auger assembly comprises a shaft having axially spaced portions extending through axial hub portions, respectively, of said outlet housings; bearing bushings axially slidable upon said shaft from its opposite ends and seated, respectively, in said hub portions of said outlet housings, and stop means at the axially outer ends, respectively, of said hub portions, removably associated with said shaft for securing the latter in axially fixed relation to said hopper.

5. The combination as set forth in claim 4, wherein oppositely pitched wire spirals affording flight sections, respectively, of said feed auger are operatively mounted on said shaft for rotation in unison therewith, and wherein said outlet housings have arcuate shield portions within said hopper in overlying relation, respectively, to adjacent end portions of said wire spirals.

6. The combination as set forth in claim 5, wherein the pitch of said wire spirals progressively increases from their relatively adjacent ends toward said hopper end walls.

7. In a fertilizer distributor, the combination of a hopper having a pair of opposite lower side openings and an upper side opening above one of said lower side openings, an assembly of oppositely pitched feed augers movable axially into and out of said hopper through one of said lower side openings and detachably mounted within said hopper in material dispensing relation to said lower side openings; and an elongated baffle member movable longitudinally into and out of said hopper through said upper side opening and detachably mounted within said hopper in overlying relation to said auger assembly; and fastening means forming a part of said assembly and coacting with said side walls of said hopper for retaining said assembly positioned in said hopper and for retaining said baffle member in said hopper.

8. In a fertilizer distributor, the combination of a hopper having imperforate, longitudinal side and bottom walls and a pair of end walls connecting said side and bottom walls, each of said end walls having a lower side opening adjacent said bottom wall and an anticlinal slot above said lower side opening; a pair of outlet housings, one detachably secured to one of said end walls in covering relation to said lower side opening and slot therein, and the other operatively mounted on the other of said end walls in covering relation to said lower side opening and slot therein, each of said outlet housings presenting a downwardly extending outlet spout exteriorly of its associated end wall; an assembly of oppositely pitched feed augers movable axially into and out of said hopper through the lower side opening of said one end wall and rotatably mounted at one end in said one outlet housing; axially separable bearing means rotatably mounting said auger assembly at its other end in said other outlet housing; and an elongated sheet metal baffle having a cross sectional profile matching said anticlinal slots, said baffle being movable longitudinally into and out of said hopper through said slot of said one end wall and supported therein at one end in overlying relation to said auger assembly; the other end of said baffle extending longitudinally into said slot of said other end wall, and said auger assembly communicating at its opposite ends in material dispensing relation, respectively, with said outlet housings.

9. The combination as set forth in claim 8 and further comprising an internal transverse brace member of said hopper intermediate said end walls, said brace member having an anticlinal slot aligned with said anticlinal slots of said end walls and presenting lower and upper edge portions in slidably engageable relation with said sheet metal baffle.

10. In a fertilizer distributor, the combination of a hopper having imperforate, longitudinal side and bottom walls and a pair of end walls connecting said side and bottom walls, each of said end walls having a lower side opening adjacent said bottom wall and a baffle supporting slot above said lower side opening; a pair of outlet housings, one detachably secured to one of said end walls in covering relation to said lower side opening and slot therein, and the other operatively mounted on the other of said end walls in covering relation to said lower side opening and slot therein, each of said outlet housings presenting a downwardly extending outlet spout exteriorly of its associated end wall; as assembly of oppositely pitched feed augers movable axially into and out of said hopper through the lower side opening of said one end wall and rotatably mounted at one end in said one outlet housing; axially separable bearing means rotatably mounting said auger assembly at its other end in said other outlet housing; and an elongated sheet metal baffle having a cross sectional profile matching said slots, said baffle being movable longitudinally into and out of said hopper through said slot of said one end wall and supported therein at one end in overlying relation to said auger assembly; the other end of said baffle extending longitudinally into said slot of said other end wall, and said auger assembly communicating at its opposite ends in material dispensing relation, respectively, with said outlet housings.

11. The combination as set forth in claim 10 wherein each of said baffle supporting slots has the shape of an inverted V with its apex positioned vertically above the axis of said auger assembly.

References Cited by the Examiner

UNITED STATES PATENTS

| 879,366 | 2/08 | Conway | 222—328 |
| 2,345,804 | 4/44 | Gemberling et al. | 222—272 X |
| 2,421,418 | 6/47 | Grossman | 222—413 X |
| 2,708,534 | 5/55 | Mason et al. | 222—272 X |
| 2,800,252 | 7/57 | Wahl | 222—413 X |
| 2,919,054 | 12/59 | Waller | 222—274 X |

LOUIS J. DEMBO, *Primary Examiner.*